United States Patent

[11] 3,557,848

| [72] | Inventor | Herbert Leslie Wright<br>Box 179, Philo, Calif. 95466 |
|---|---|---|
| [21] | Appl. No. | 701,163 |
| [22] | Filed | Jan. 29, 1968 |
| [45] | Patented | Jan. 26, 1971 |

[54] SAWING MACHINE AND SYSTEM
2 Claims, 5 Drawing Figs.

[52] U.S. Cl. .................................................. 143/160,
83/168, 143/158, 143/133
[51] Int. Cl. ..................................................... B27b 11/02,
B23d 21/14, B27b 5/28
[50] Field of Search............................................. 143/160,
160—1, 160—3, 160—4, 160—5, 160—6,
160—7, 160—8, 160—9, 161, 162, 162—1, 163,
163—1, 164, 165, 166, 167; 83/168

[56] References Cited
UNITED STATES PATENTS

| 334,818 | 1/1886 | Stephens et al. | 143/160 |
|---|---|---|---|
| 634,206 | 10/1899 | Drake | 143/164 |
| 999,500 | 8/1911 | Hull | 143/160 |
| 2,815,561 | 10/1957 | Crane | 143/165X |
| 2,934,106 | 4/1960 | Chapman et al. | 143/160 |
| 2,992,663 | 7/1961 | Hendrickson | 143/166 |
| 3,104,575 | 9/1963 | Robinson | 83/168 |
| 3,225,801 | 12/1965 | Dunn et al. | 143/160 |
| 346,565 | 8/1886 | Simonds | 143/133 |

*Primary Examiner*—Harrison L. Hinson
*Attorney*—Flehr, Hohbach, Test, Albritton and Herbert

ABSTRACT: A cyclic saw having a thin, flexible, broad band blade, of tapered thickness, guided by fluid bearings coacting with the side faces of the band blade.

PATENTED JAN26 1971
3,557,848
SHEET 1 OF 2
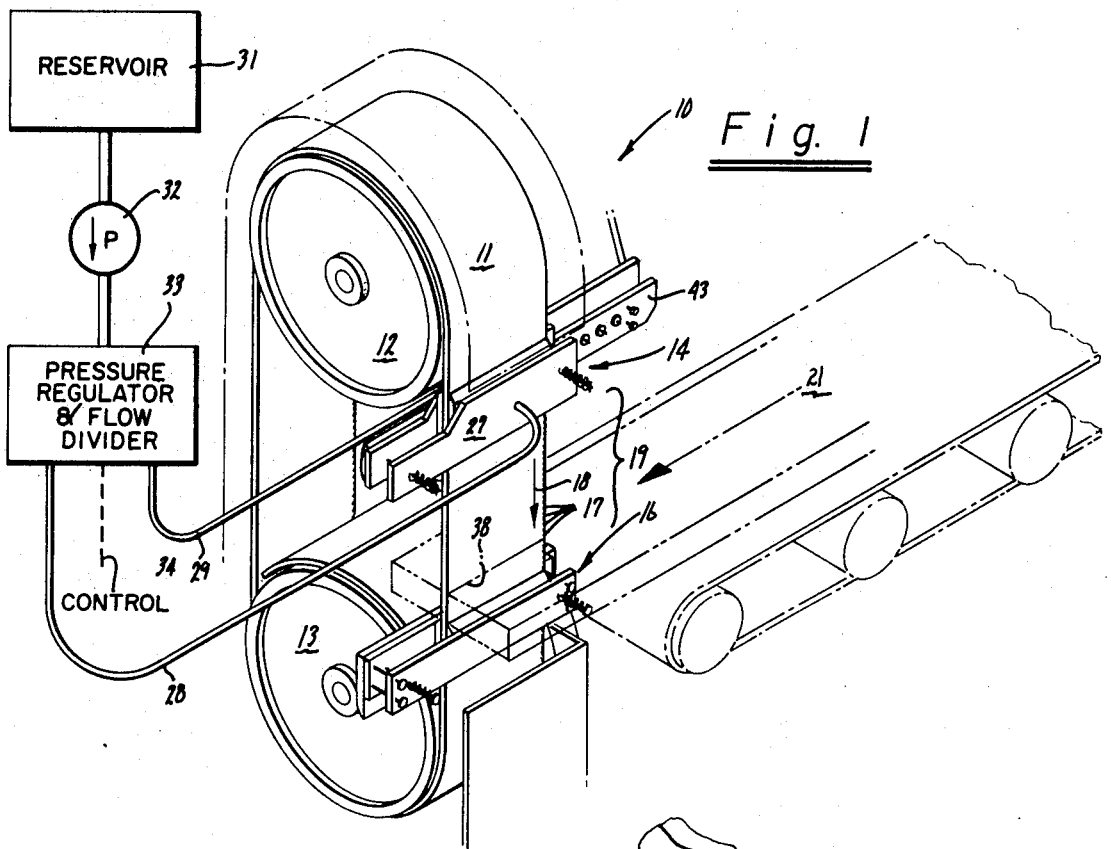
Fig. 1
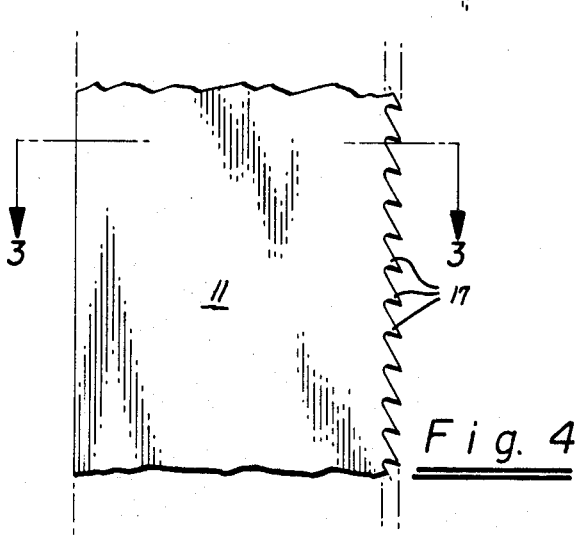
Fig. 4
Fig. 3
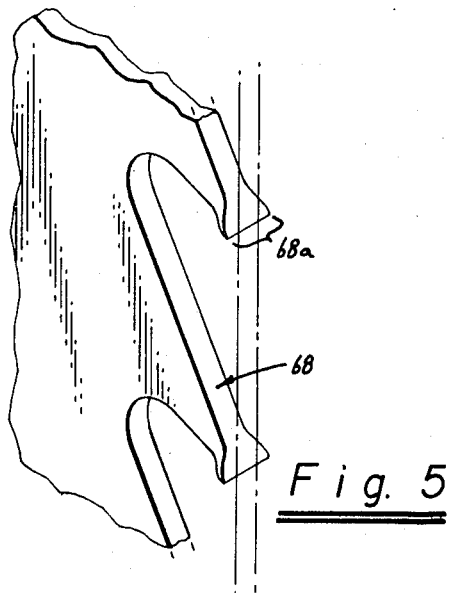
Fig. 5
PRIOR ART
INVENTOR.
Herbert Leslie Wright
BY *Flehr, Hohbach, Test,*
*Albritton & Herbert*
Attorneys INVENTOR.
Herbert Leslie Wright 3,557,848

SAWING MACHINE AND SYSTEM

BACKGROUND OF THE INVENTION

This invention pertains to a sawing machine and system which is particularly useful in cutting logs into lumber preferably formed with so-called "finished" surface.

As is known, lumber is provided in a number of different sizes according to standard dimensions. The actual dimensions for so-called "finished" lumber board will seldom correspond to the dimension designated to identify same. For example, a ½ inch "finished" board will actually measure less than one-half inch in thickness since the process of finishing the surface of the board to provide a smooth surface serves to diminish the actual dimension of the board. Much lumber is also sold as rough lumber where the actual and designated sizes correspond. The price of rough lumber is generally less than corresponding sizes of finished lumber. Less labor is required for the former.

For example, to form logs into finished lumber a number of manipulative steps are involved in a mill. The log, for example, may be cut initially into so-called "cants." Then, using an edger, the "cants" may be sliced into rough lumber. Subsequently, an additional step may involve the use of a trimmer to form the cants with uniform lengths as desired. Subsequently, a planing machine may be involved, for example, where the unfinished boards are to be provided with a finished surface by planing.

Where it is possible to form the logs directly into finished lumber, a considerable saving in labor and expenses would be immediately evident as well as an actual saving in the lumber planed away. For example, if the cut made in forming the lumber were sufficiently smooth, the step of planing the lumber could be eliminated with its consequent waste of shaved wood.

While the foregoing objective is generally desirable, it has, it is believed, not been practicable for a number of reasons, For example, it is generally considered that to provide a very smooth cut on the surface of a board competitive with planing of the board, a saw should be operable at substantially greater speeds than presently employed. In addition the teeth of the saw blade should, it is believed, need to be spaced more closely together than is presently the practice.

The use of high-speed band saws, for example, for this purpose is conventionally impracticable since in order to limit the excursions of the plane of the band saw blades out of a predetermined cutting plane, the saw bands have been required to be of relatively thick material which makes them quite heavy and difficult, if not impossible, to be trained about drive rollers of anything less than what might be considered quite large diameter rollers. The size and mass of these great band saw drive wheels make the apparatus quite difficult to operate at high speed and also serve to introduce objectionable vibrations which are difficult to eliminate. Thus, in general, band saw blades have been driven at the slower speeds imposed by the nature of such apparatus. The saw teeth have, therefore, also been strengthened by providing a swaged tip portion on each tooth which necessarily provides a wastefully wide kerf or cut through the log.

In order to provide the requisite high-speed saw operation and tooth spacing, there has been provided herein a relatively thin band saw blade for operation in conjunction with a guiding system characterized by fluid bearings acting upon the side faces of the blade so as to guide the blade and control it to operate within a predetermined plane.

Thus, the bulky, thick nature of prior blades has been avoided. Accordingly, by utilizing a relatively thin blade, it has become possible to train the blade about a drive roller of considerably reduced diameter thereby eliminating a number of collateral problems previously involved.

In order to impart adequate strength to the relatively lightweight blade, the width or span of the blade is quite wide relative to the thickness thereof. Further, the blade includes a tapered thickness diminishing in a direction extending away from the teeth of the blade an in this manner, the sides of the blade following the teeth along the cut in a board or log will have a slight clearance and experience less frictional resistance to movement of the blade through the log or board.

SUMMARY OF THE INVENTION AND OBJECTS

According to the present invention, a sawing machine has been provided of a type having a cyclically driven saw blade disposed to cut materials when moved into the teeth of the saw blade wherein the saw blade is guided by fluid means serving to control the plane of the blade as it passes through a working zone adapted to receive materials such as lumber, supplied thereto. Fluid means for so guiding the blade includes at least one fluid bearing forming an applied bearing layer of fluid under pressure acting against at least one side of the saw blade in conjunction with means serving to apply a counterforce acting against the other side to the saw blade so as to support the saw blade between the fluid bearing the counterforce.

In conjunction with the above, there has been provided an improved saw blade construction for cooperating with the above mentioned fluid bearing guide means. Thus, the saw blade construction is formed as a band of relatively broad width and of a relatively thin flexible material so as to provide a strong flexible band with teeth formed along one edge of the band. The teeth lie substantially within the thickness of the band material adjacent thereto. The thickness of the band diminishes progressively in a direction leading away from the teeth.

Thus, by forming the teeth to lie substantially in the plane of the blade, a relatively narrow kerf or cut can be provided through the lumber. By so narrowing the kerf it is thus possible to obtain additional useful lumber from a given size log.

It is a general object of the present invention to provide an improved sawing machine and system.

It is another object of the invention to provide an improved sawing machine charcterized by a lightweight relatively thin, wide band cooperating with means for guiding the band saw blade both above and below a working zone of a type for receiving logs or lumber to be cut therein.

It is yet another object of the invention to provide an improved sawing machine wherein the saw blade is guided by an applied fluid surface forming a fluid bearing for supporting the blade in a predetermined plane.

These and other objects of the invention will be more readily apparent from the following detailed description according to a preferred embodiment.

BRIEF DESCRIPTION OF THE DRAWING

FIG. 1 is a schematic perspective view showing a sawing system, according to the invention;

FIG. 3 is a transverse section view of a saw blade shown in FIG. 4 taken along the line 3–3 thereof;

FIG. 4 is a side elevation of the band saw blade shown in FIG. 3;

FIG. 5 is a schematic perspective view in enlarged detailed of swaged teeth employed by prior art band saw blades.

DESCRIPTION OF THE PREFERRED EMBODIMENT

Figure 2:
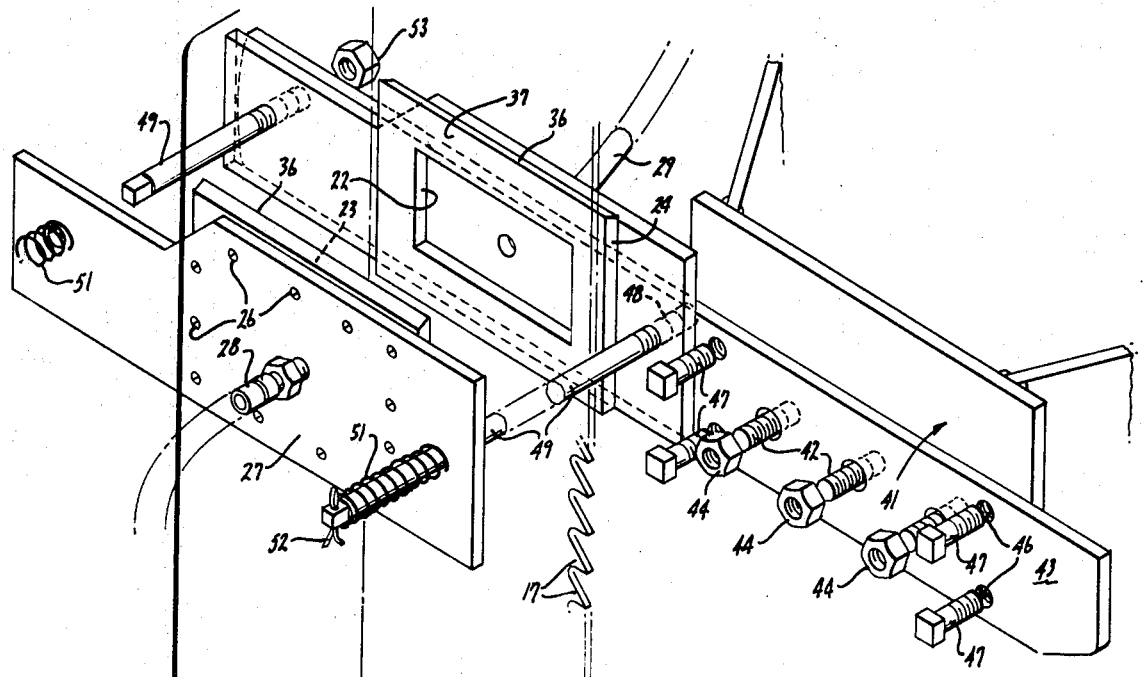
FIG. 2 is a schematic perspective exploded view showing a guiding system for guiding a band saw blade, according to the invention.
Figure 2:
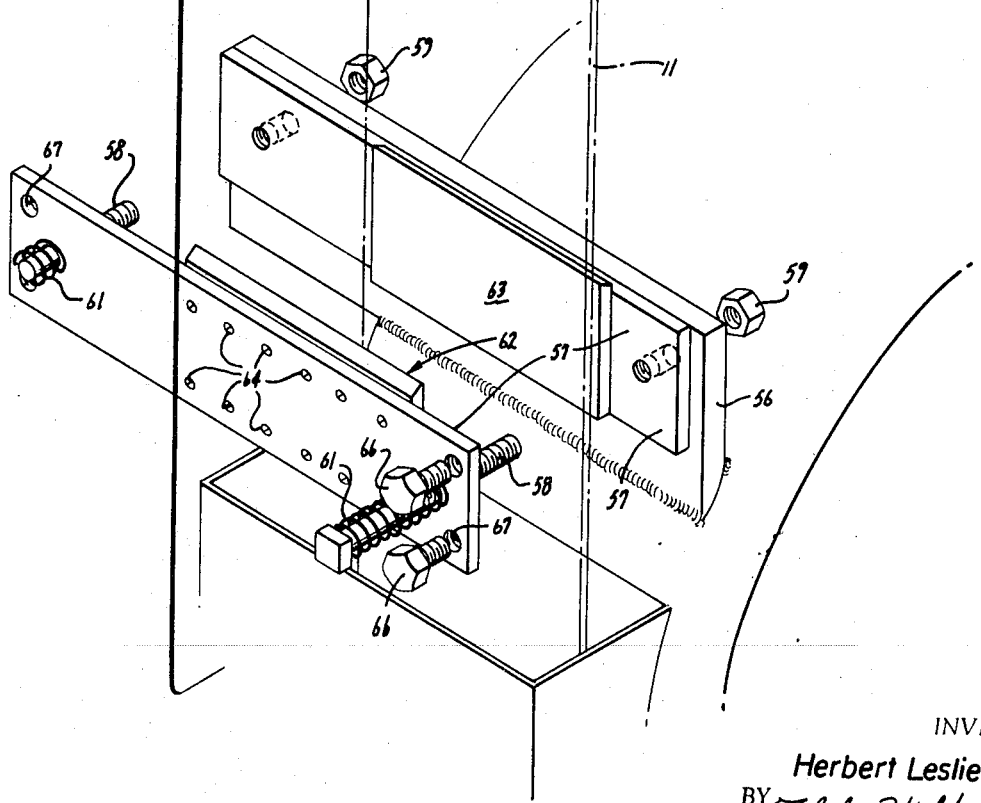

Referring to the drawings, FIG. 1 shows schematically a sawing machine 10 characterized by a band saw blade 11 trained about a pair of band wheels 12, 13. The diameter of band wheels 12, 13 is relatively small compared to conventional band wheels presently employed for comparable cutting assignments.

It is to be understood that various additional conventional mechanism can be typically employed to operate the sawing machine 10 schematically represented in FIG. 1. For example, in conventional manner, the axes of rotation for band wheels 12, 13 may be arranged to be relatively raised and lowered with respect to each other for applying and removing a band saw blade to the apparatus.

The driving mechanism for band wheels 12, 13 can also be readily employed in conventional manner. For instance, one of the two band wheels 12, 13 is driven directly by a power source whereas the other band wheel will be merely an idler.

The sawing machine 10, however is characterized by the novel arrangement of upper and lower band guiding assemblies 14, 16 respectively. Blade 11 includes cutting teeth 17 formed along one edge and is trained to move teeth 17 downwardly in the direction of arrow 18 through a working zone 19 into which lumber or logs may be fed as by means of a suitable conventional conveyor system 21, as shown in phantom lines in FIG. 1.

From the foregoing, it will be readily apparent that the upper band guiding assembly 14 is upstream of the working zone 19 and train lower band guiding assembly 16 is disposed downstream of the working zone 19. It is further to be appreciated that working zone 19 is generally to be considered the region wherein material carried by conveyor 21 will move into engagement with teeth 17 of blade 11 for cutting.

In order that blade 11 will be properly guided and relatively closely controlled in its own plane through this relatively critical portion of its cyclic path, band guiding assemblies 14, 16, as now to be described, cooperate with the opposite side face (hereinafter "sides") of blade 11.

Assembly 14 provides an applied bearing layer of fluid under pressure acting against the opposite sides of blade 11. Thus, a fluid bearing is provided in the form of a pair of confronting relatively planar reservoirs 22, 23 which are identical and, accordingly, only reservoir 22 will be described in detail hereafter.

Each reservoir includes a housing 24 carried by lines of screws 26 on the confronting faces of a pair of adjustable support plates 27. Housing 24 is of a material which is softer than the material of blade 11 so that any wear will be taken by the four margins of housing 24 rather than by the usually more expensive blade 11. For example, housing 24 may be made of plywood so that it will wear relatively easily compared to the wear experienced by the steel of blade 11.

Each of reservoirs 22, 23 is supplied by means delivering fluid under pressure, for example, via the pressure lines 28, 29. Lines 28, 29 are each supplied by liquid, such as water, from the hydraulic system shown in FIG. 1. For example, a reservoir 31 is provided to supply a pump 32 which, in turn, feeds water to a pressure regulator and flow divider mechanism of suitable conventional design 33 arranged with a suitable control 34 whereby the pressure in each of lines 28, 29 can be properly controlled to provide the desired fluid bearing action to opposite sides of blade 11.

The upper edges of each of housings 24 has been tapered to form a cleaning blade portion 36 adapted to engage and scrape any foreign materials from the side faces of blade 11 as it moves toward the working zone 19. In operation, each of housings 24 are yieldingly "loaded" or urged tightly against the side faces of blade 11 and water under pressure is applied to each of reservoirs 22, 23. The pressure is sufficient to cause a slight outflow of water from each of the two housings so as to supply a fluid bearing between the margins of housings 24 and the surfaces of blade 11. Thus, the lower margin 37 of housings 24 may preferably be made of a nonwettable material, such as nylon, having the capability of accepting limited wear from the blade 11 while supplying the limited flow of liquid along the side face of blade 11.

As blade 11 proceeds downwardly toward the kerf 38 defined in any lumber being cut by the machine, a thin sheet of water will be carried downwardly along the side faces of blade 11 thereby lubricating and cooling lumber at the kerf 38.

It is to be understood, however, that kerf 38, as shown in FIG. 1, represents an imaginary kerf line inasmuch as there has not been shown a work piece, such as a log or other lumber, in position in the process of being cut by machine 10.

Means for mounting support plates 27 in a manner whereby they may be twisted or otherwise positioned so as to provide appropriate guiding of blade 11 therebetween comprises the rigid reinforced stationary mounting stand 41 secured to a permanent portion, such as the housing (not shown) of machine 10. Thus, mounting stand 41 represents a firmly secure base to which the fluid bearings provided by assembly 14 may be carried. Mounting stand 41 includes three laterally spaced relatively large diameter mounting studs 42 projecting therefrom through cooperating holes formed through the end of a relatively thick, rigid support arm 43. The mounting studs 42 are slightly loose within their cooperating holes formed in support arm 43 whereby slight movements for adjustment can be developed, as now to be described.

Nuts 44, applied to studs 42, hold arm 43 in place. The four corners of that portion of arm 43 contiguous to mounting stand 41 include threaded adjustment holes 46 whereby each may receive a threaded stud 47 adapted to be screwed into holes 46 and against the surface of stand 41. Each of studs 47 is thus in position to force a related corner of the right hand portion (as viewed in FIG. 2) of arm 43 away from stand 41 limited only by the position of nuts 44. As thus arranged, it will be readily evident that each of the four threaded studs 47 can be variously adjusted and the orientation of the plane of arm 43 thereby variously defined.

At the other end of arm 43 a pair of threaded holes 48 are formed, each of which is adapted to receive the threaded ends of a pair of mounting pins 49. Thus, the adjustable support plates 27 are slidably received onto pins 49 with a limited looseness.

Means for yieldingly urging one of the support plates 27 toward the other (to be resisted by the action of the fluid bearing supplied by fluid under pressure fed to reservoirs 22, 23) comprises the springs 51 carried on the outer ends of mounting pins 49. Springs 51 are disposed to press respectively at their opposite ends against retaining pins 52 and the outer surface of plate 27.

In order for springs 51 to provide appropriate compressed action, mounting pins 49 may be screwed to the extent desired into threaded holes 48 until their inserted ends project from the remote or far side of arm 43 (as shown in FIG. 2). At that point, a locknut 53 can be screwed onto the end of the pins 49 so as to fix the amount of spring tension applied to plate 27.

When blade 11 has been properly positioned between the confronting faces of the margins of housings 24, it will be readily evident that the compressive action of springs 51 will be resisted by a counterforce supplied by the fluid pressure of each of reservoirs 22, 23. As thus arranged, blade 11 will be supported in its own plane carried on a pair of fluid bearings defined between the guide housings 24, and water will be drawn by the moving blade downwardly from the bottom of each of housings 24 and into the kerf 38 for both cooling and lubricating the blade in the kerf.

Guiding assembly 16 is disposed below the working zone 19 and, as arranged, is readily adjustable from the front of the machine inasmuch as access to the rear of the apparatus is relatively inconvenient.

Further, it will be readily apparent that the guiding assembly 16 comprises a heavy-duty rigid mounting base 56 permanently secured, for example, as by welding, to the stationary structure of the sawing machine 10. Support plates 57 have been loosely provided to ride upon mounting pins 58 in a manner similar to the arrangement as above described relative to mounting pins 49 and support plates 27. Thus, for example, locknuts 59 are employed on the threaded inner ends of pins 58 so as to establish a selected compressive force to be applied by springs 61. The outer support plate 57 is arranged, however, whereby it may be adjusted so as to vary or even twist the plane of the solid planar bearing pad 62 relative to blade 11 and/or relative to the confronting face of a comparable solid planar bearing pad 63 carried by the other support plate 57. Bearing pads 62, 63 are, for example, of a consumable material, such as plywood or other readily wearable material, adapted to be worn away in preference to inducing wear upon blade 11.

Support plates 57 hold pads 62, 63 in place by means of the two rows of screws 64. Thus, studs 66 threaded through cooperating threaded holes 67 extend through the outer support plate 57 whereby the inner ends of studs 66 will bear upon the face of the other support plate 57. In this manner, by adjusting the four studs 66, the orientation of the confronting surface of bearing pad 62 may be adjusted relative to the other bearing pad 63.

The above guiding arrangement for closely controlling blade 11 in a predetermined plane is preferably employed in conjunction and cooperation with a relatively thin blade 11 as now to be described in more particular detail than referred to generally above.

Thus, referring to FIG. 5, it will be readily apparent that in the prior art style of saw tooth 68, as for use with band saws of a type intended for relatively heavy-duty sawing, the typical tooth included a swaged tip 68a whereby the thickness of the tip would cause the tooth to bulge generally outside the plane of the blade itself. Obviously, the kerf formed when cutting lumber with such a saw would be relatively broad.

By comparison, it is apparent in FIGS. 3 and 4 that there is provided herein a saw blade 11 capable of being relatively thin to form a narrow kerf. For example, the blade includes a tapered thickness extending in a direction away from the teeth 17 wherein the blade becomes progressively thinner. For instance, in one embodiment utilizing a blade of the kind described in FIGS. 3 and 4 the width (represented by dimension 69) of blade 11 ran on the order of 11 inches whereas the thickness of the blade at its trailing end 71 ran on the order of 0.025 inch while the thickness at the leading or cutting edge 72 ran on the order of 0.032 inch. It has been observed that a ratio of width to the general thickness of the blade will be relatively satisfactory for training about relatively small diameter band wheels where the ratio of length to the general thickness of the blade runs on the order of at least 150 to 1. It is also to be observed that teeth 17 of blade 11 lie within the thickness of blade 11 and do not protrude beyond the planes defining the side surfaces of blade 11 thereby imposing no additional thickness to the kerf or cut formed by blade 11.

From the foregoing, it will be readily apparent that there has been provided a sawing machine characterized by means for guiding the band saw blade within close limits relative to the plane of movement of the blade and wherein a relatively lightweight thin blade can be utilized to proved high-speed blade movement. By virtue of being able to employ lightweight blade materials, it is also possible to minimize the mass and bulk of the sawing machine 10 so as to permit the practicable achievement of high-speed blade movement without introducing the otherwise objectionable problems entailed in operating large massive machinery at high speed. In this manner, the teeth formed along the cutting edge of the blade may be relatively closely spaced, and the teeth may be permitted to remain in the plane of the blade.

From the foregoing, it will also be readily apparent that the sawing machine 10, is therefore, suitable for minimizing the manipulative procedures involved in forming so-called "-finished" lumber while at the same time preserving the standard dimensions therefor, i.e., without need to further plane down the the lumber surface.

It will also be apparent that in operation, the teeth of the blade (as well as the side faces of the blade) will pass between the surfaces of guiding pads 62, 63 so as to be cleaned during each revolution of operation.

I claim:

1. In a sawing machine of the type having a saw blade driving in a cyclic path, wherein the saw blade is disposed for movement substantially in a plane through a working zone for cutting materials when moved along a path into the teeth of the saw blade in said zone, the improvement comprising fluid means disposed in cooperative relation with respect to a side of the saw blade and serving to control the plane of the blade for cutting said materials, said fluid means including first means forming an applied bearing layer of fluid under pressure acting against one side of said blade, and second means serving to apply a counterforce acting against the other side of the blade to support and guide the blade in a plane between said fluid bearing layer and the last named means, said first and second means being yieldingly disposed in confronting relation with respect to each other on opposite sides of the blade and in confronting relation thereto, and means adjustably twist the plane of said blade, the last named means including a mounting member carrying both said first and second means, and means for adjustably securing said member to a stationary portion of the sawing machine, the last named means being disposed to be readily adjustable from an operator's position when standing at the side of the path of movement of the materials being cut to conjointly vary the orientation of said member and said first and second means.

2. In a sawing machine according to claim 1 wherein said saw blade comprises an endless band of relatively broad width and of a relatively thin flexible material, the band further including teeth formed along one edge thereof said band having a tapered thickness diminishing progressively in a direction leading away from said teeth.